United States Patent
Liao

(10) Patent No.: US 6,931,737 B1
(45) Date of Patent: Aug. 23, 2005

(54) LASER LEVEL DEVICE

(75) Inventor: Chen Cheng Liao, Taichung (TW)

(73) Assignee: Asia Optical Co, Inc., Taichung (TW)

( * ) Notice: Subject to any disclaimer, the term of this patent is extended or adjusted under 35 U.S.C. 154(b) by 0 days.

(21) Appl. No.: 10/863,225

(22) Filed: Jun. 9, 2004

(30) Foreign Application Priority Data

Jan. 30, 2004 (TW) .................................... 93102244 A

(51) Int. Cl.$^7$ ........................ G01B 11/26; G01C 15/00
(52) U.S. Cl. .................. 33/227; 33/286; 33/DIG. 21
(58) Field of Search .......................... 33/227, 276, 277, 33/285, 286, DIG. 21; 356/138

(56) References Cited

U.S. PATENT DOCUMENTS

| | | | | |
|---|---|---|---|---|
| 3,771,876 A | | 11/1973 | Ljungdahl | 356/138 |
| 3,897,637 A | | 8/1975 | Genho | 33/227 |
| 4,333,242 A | | 6/1982 | Genho | 33/227 |
| 4,770,480 A | * | 9/1988 | Teach | 356/138 |
| 4,852,265 A | | 8/1989 | Rando | 33/227 |
| 4,904,081 A | | 2/1990 | Miyahara | 356/152 |
| 4,912,851 A | | 4/1990 | Rando | 33/227 |
| 5,218,770 A | * | 6/1993 | Toga | 33/276 |
| 5,539,990 A | * | 7/1996 | Le | 33/286 |
| 6,539,638 B1 | * | 4/2003 | Pelletier | 33/290 |
| 6,598,304 B2 | * | 7/2003 | Akers | 33/286 |
| 6,603,546 B1 | * | 8/2003 | Barbieri et al. | 356/318 |
| 6,618,950 B2 | * | 9/2003 | Huang et al. | 33/286 |
| 6,694,629 B2 | * | 2/2004 | Goodrich | 33/286 |
| 6,792,685 B1 | * | 9/2004 | Ng et al. | 33/286 |
| 2005/0005462 A1 | * | 1/2005 | Heger at al. | 33/286 |

* cited by examiner

Primary Examiner—G. Bradley Bennett
(74) Attorney, Agent, or Firm—Troxell Law Office, PLLC

(57) ABSTRACT

A laser level includes a laser light source adapted to emit a laser beam, a beam-splitting unit splitting the laser beam into a number of light beams along multi different directions and a beam-outgoing unit dispersing the number of light beams to form corresponding number of horizontal sector-shaped output beams. These sector-shaped output beams together form an output beam having an angle approximately of 360 degrees.

15 Claims, 2 Drawing Sheets

LASER LEVEL DEVICE

CROSS-REFERENCE TO RELATED APPLICATIONS

Relevant subject matter is disclosed in U.S. patent application Ser. No. 10/838,348 filed on May 5, 2004 with the same assignee and entitled as "SIDE BY SIDE LASER LEVEL DEVICE".

BACKGROUND OF THE INVENTION

1. Field of the Invention

The present invention relates to a laser level, and particularly to a laser level capable of level indication along multi directions in a circumferential area simultaneously.

2. Description of Related Art

In the construction industry, drawing or determining a distant horizontal or vertical line from a reference line is sometimes not easy to achieve in one step, especially for those desired lines located at different walls. Conventional methods for carrying out the line-drawing or line-determination operation can be performed by utilizing rulers, ink-string boxes, levelers, and so on as are well-known in the art. However, these conventional methods may be tedious and difficult to achieve accurately, and may be subject to human error.

Subsequently, a variety of survey tools employing lasers have been developed to determine level horizontal or plumb vertical planes for construction, surveying, remodeling, etc. For example, U.S. Pat. Nos. 3,771,876, 3,897,637, 4,333,242, 4,852,265, 4,904,081 and 4,912,851 illustrate various apparatuses utilizing laser technology for the construction industry: These and other similar devices utilize lasers to assist in leveling, aligning, plumbing or surveying operations.

U.S. Pat. No. 3,771,876 is directed to a laser apparatus for producing a plane or conical optical reference surface. The device includes a pendulum hanging from a flexible suspending member, with the pendulum containing the light source so as to be self-leveling. A prism is used for reflecting the beam out of the device 90 degrees from the entry angle of the beam from the pendulum. The prism is mounted on a vertical axle which can be caused to be rotated by a motor, whereby a conical reference surface is produced. However, the rotation of the prism is easy to cause the laser apparatus to shake, thereby adversely affecting the accuracy of the laser apparatus. Further, since a motor is employed to drive the prism to rotate, the volume of the laser apparatus is inevitably increased and the manufacturing cost is also increased.

In U.S. Pat. No. 3,897,637, there is disclosed a level tool utilizing a helium-neon laser for projecting a beam both vertically and horizontally. The device is not self-leveling and requires manual leveling. It is rather large and requires connection to an external source of power.

In some applications, when there is a need to provide level indication along various directions in a circumferential area, multi level indications are conducted time after time. Obviously, it is time-consuming.

Hence, an improved laser lever is required to overcome the disadvantages of the related art.

SUMMARY OF THE INVENTION

Accordingly, a first object of the present invention is to provide a laser level capable of level indication along multi directions in a circumferential area simultaneously.

A second object of the present invention is to provide a laser level having a simplified configuration and a low manufacturing cost.

In order to achieve the objects set forth, a laser level in accordance with the present invention comprises a laser light source adapted to emit a laser beam, a beam-splitting unit comprising a first, a second and a third beam splitters. and a beam-outgoing unit. The first beam splitter splits the laser beam into two light beams along a first and a second directions. The second and the third beam splitters are respectively arranged in the first and the second directions to split the two light beams into four light beams along four different directions. The beam-outgoing unit disperses the four light beams to form four horizontal sector-shaped output beams. The four sector-shaped output beams together form an output beam having an angle approximately of 360 degrees.

Other objects, advantages and novel features of the invention will become more apparent from the following detailed description when taken in conjunction with the accompanying drawings.

DETAILED DESCRIPTION OF THE PREFERRED EMBODIMENT

Reference will now be made in detail to the preferred embodiment of the present invention.

Figure 1:
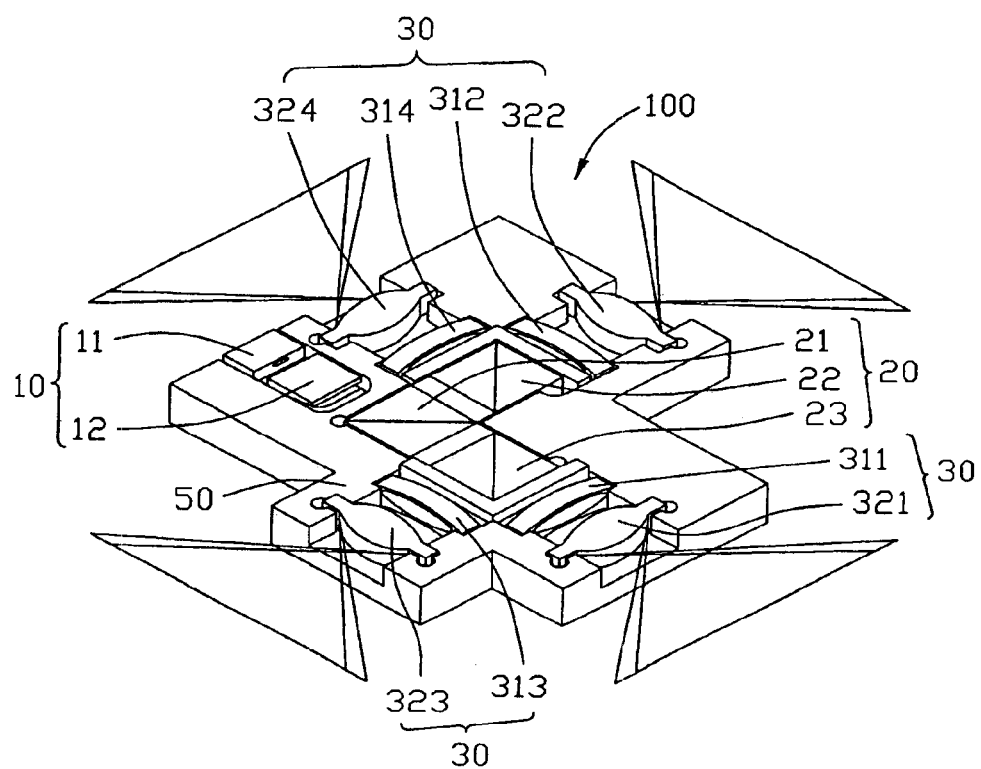
FIG. 1 is a perspective view of a laser level in accordance with the present invention.

Referring to FIG. 1, a laser level 100 in accordance with the present invention comprises a base 50 and an optical system retained in the base 50. The optical system comprises a beam-incoming unit 10, a beam-splitting unit 20 and a beam-outgoing unit 30.

The beam-incoming unit 10 includes a semiconductor laser module 11 as a light source and a diverging lens 12. The diverging lens 12 is arranged in a position through which a laser beam emitted from the laser module 11 extends. The laser beam is adjusted by the diverging lens 12 to have a predetermined angle and a substantially circular cross section.

The beam-splitting unit 20 includes a first beam splitter 21, a second beam splitter 22 and a third beam splitter 23. These three beam splitters 21, 22, 23 have the same structure and each has a beam splitting interface having an angle of 45 degrees. Each of the first, the second and the third beam splitters 21, 22, 23 is effective to split the laser beam into two simultaneous light beams along two perpendicular directions.

The beam-outgoing unit 30 includes a first, a second, a third and a fourth collimating lenses 311, 312, 313, 314 and a first, a second, a third and a fourth aspheric cylindrical lenses 321, 322, 323, 324.

Figure 2:
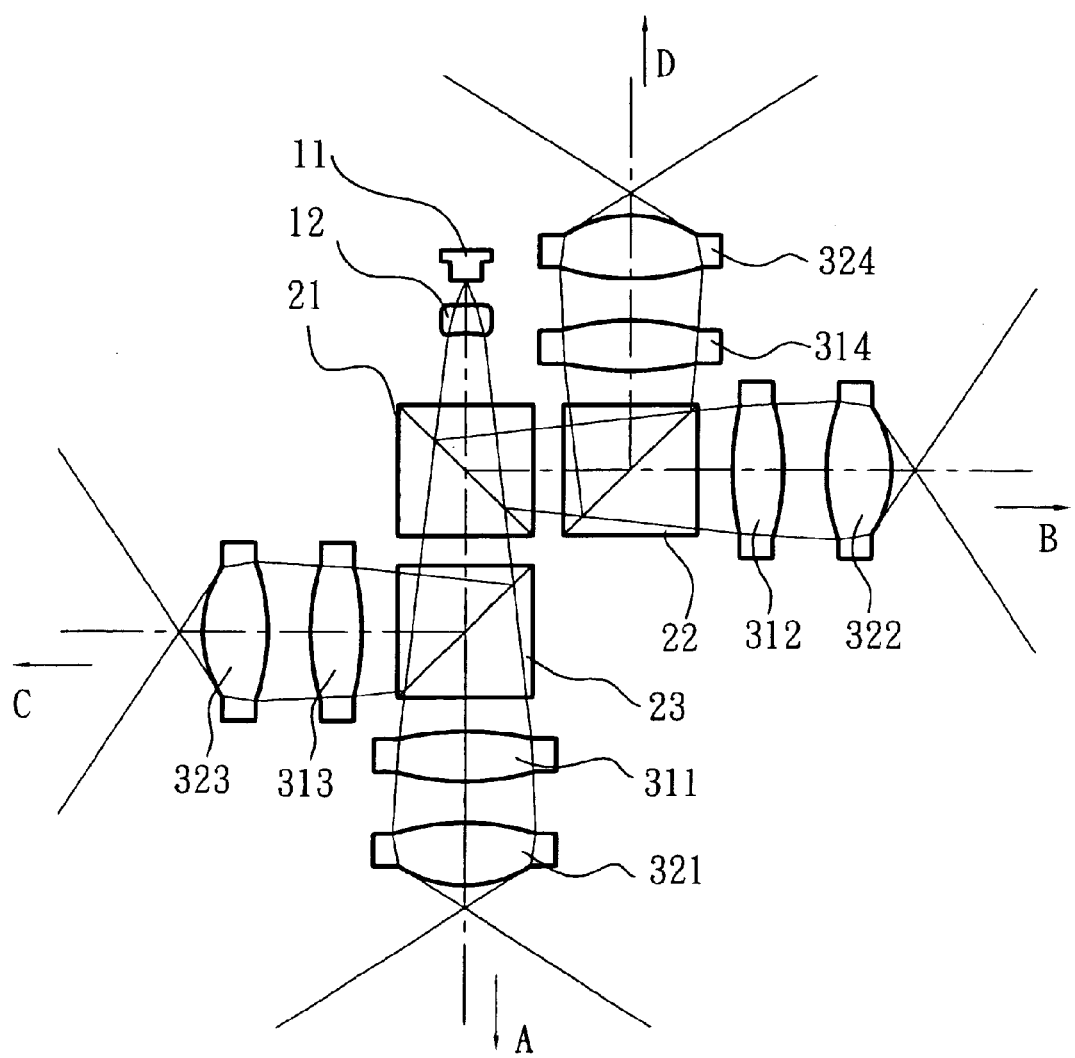
FIG. 2 is an optical diagram of the laser level.

Referring to FIG. 2 in conjunction with FIG. 1, the first beam splitter 21 is arranged in a position through which the laser beam extends. The first beam splitter 21 is effective to split the laser beam into two simultaneous light beams along a first direction A and a second direction B perpendicular to the first direction A. The laser beam emitted from the laser module 11 is spread through the diverging lens 12 to have a predetermined angle and then is directed to the first beam splitter 21. The first beam splitter 21 transmits a portion of the laser beam providing a first light beam in the first direction A and reflects a portion of the laser beam to provide a second light beam in the second direction B.

The third beam splitter 23 is adjacent the first beam splitter 21 and arranged in a position through which the first light beam extends. The third beam splitter 23 transmits a portion of the first light beam in the first direction A and reflects a portion of the first light beam in a third direction C perpendicular to the first direction A. Then, the portion of the first light beam in the first direction A transmits to the first collimating lens 311 and is collimated to form a first horizontal band-shaped light beam. The first aspheric cylindrical lens 321 finally disperses the first horizontal band-shaped light beam to form a first horizontal sector-shaped output beam having an angle greater than 90 degrees. In addition, the illumination of the first horizontal sector-shaped output beam is uniformized by the first aspheric cylindrical lens 321.

At the same time, the portion of the first light beam in the third direction C transmits to the third collimating lens 313 and is collimated to form a third horizontal band-shaped light beam. The third aspheric cylindrical lens 323 finally disperses the third horizontal band-shaped light beam to form a third horizontal sector-shaped output beam having an angle greater than 90 degrees. In addition, the illumination of the third horizontal sector-shaped output beam is uniformized by the third aspheric cylindrical lens 323.

The second light beam transmits in a manner similar to that of the first light beam described above. The second beam splitter 22 is adjacent to the first beam splitter 21 and arranged in a position through which the second light beam extends. The second beam splitter 22 transmits a portion of the second light beam in the second direction B. Then, the portion of the second light beam in the second direction B transmits to the second collimating lens 312 and is collimated to form a second horizontal band-shaped light beam. The second aspheric cylindrical lens 322 finally disperses the second horizontal band-shaped light beam to form a second horizontal sector-shaped output beam having an angle greater than 90 degrees. In addition, the illumination of the second horizontal sector-shaped output beam is uniformized by the second aspheric cylindrical lens 322.

At the same time, the second beam splitter 22 reflects a portion of the second light beam in a fourth direction D perpendicular to the second direction B. Then, the portion of the second light beam in the fourth direction D transmits to the fourth collimating lens 314 and is collimated to form a fourth horizontal band-shaped light beam. The fourth aspheric cylindrical lens 324 finally disperses the fourth horizontal band-shaped light beam to form a fourth horizontal sector-shaped output beam having an angle greater than 90 degrees. In addition, the illumination of the fourth horizontal sector-shaped output beam is uniformized by the fourth aspheric cylindrical lens 324.

As described above, each aspheric cylindrical lens of the laser level 100 disperses the laser beam emitted from the laser module 11 to form a horizontal sector-shaped output beam having an angle greater than 90 degrees. Four aspheric cylindrical lenses 321, 322, 323 and 324 together form a horizontal output beam in a circumferential area to thereby perform level indication along multi directions simultaneously. It is appreciated that the laser beam emitted from the laser module 11 is evenly dispersed by the four aspheric cylindrical lenses 321, 322, 323 and 324 to form four sector-shaped output beams in four different directions.

It is noted that the present invention provides three beam splitters 21, 22 and 23 to split the laser beam emitted from the laser module 11 into four light beams along four different directions A, B, C and D as indicated in FIG. 2. Then, the four light beams respectively transmit to four aspheric cylindrical lenses 321, 322, 323 and 324 and are dispersed to form four horizontal sector-shaped output beams each having an angle greater than 90 degrees. The four horizontal sector-shaped output beams together form an output beam in a circumferential area to perform level indication along multi directions simultaneously. It is appreciated that the laser level 100 of the present invention has a simplified structure since there is no moveable mechanism. Further, in use, the laser level 100 is neither subject to vibration nor requires connection to an external source of power.

It is understood that the type and the number of the beam splitters of the beam-splitting unit 20 can be changed according to the beam diffused angle of the beam-outgoing unit 30. For example, if a single light beam splitted from the laser beam can be dispersed to form a sector-shaped output beam having an angle of 120 degrees, it is obvious that only two beam splitters are required to evenly split the laser beam emitted from the laser module 11 into three light beams.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A laser level comprising:
   a laser light source adapted to emit a laser beam;
   a beam-splitting unit splitting the laser beam into plural light beams along multi different directions; and
   a beam-outgoing unit dispersing the light beams to form plural horizontal sector-shaped output beams, these sector-shaped output beams together forming an output beam having an angle approximately of 360 degrees.

2. The laser level as claimed in claim 1, wherein the beam-splitting unit splits the laser beam into four light beams along four different directions.

3. The laser level as claimed in claim 2, wherein the beam-outgoing unit disperses each light beam to form a horizontal sector-shaped output beam having an angle greater than 90 degrees.

4. The laser level as claimed in claim 3, wherein the laser light source is a semiconductor laser module.

5. The laser level as claimed in claim 4, wherein the beam-splitting unit comprises a first, a second and a third beam splitters, and each beam splitter has a splitting interface having an angle of 45 degrees.

6. The laser level as claimed in claim 5, wherein the first beam splitter transmits a portion of the laser beam in a first direction and reflects a portion of the laser beam in a second direction different from the first direction, and
   wherein the second and the third beam splitters are respectively arranged in the first and the second directions.

7. The laser level as claimed in claim 6, further comprising a first, a second, a third and a fourth collimating lenses disposed between the beam-outgoing unit and the second and the third beam splitters for collimating each light beam transmitted from a corresponding one of the second and the third beam splitters to form a horizontal band-shaped light beam.

8. The laser level as claimed in claim 7, wherein the beam-outgoing unit comprises a first, a second, a third and a fourth aspheric cylindrical lenses, each aspheric cylindrical lens dispersing the band-shaped light beam to form a horizontal sector-shaped output beam having an angle greater than 90 degrees.

9. The laser level as claimed in claim 8, further comprising a diverging lens disposed between the laser light source and the first beam splitter for adjusting the laser beam emitted from the laser light source to have a predetermined angle and a substantially circular cross section.

10. A laser level comprising:
   a laser light source adapted to emit a laser beam;
   a beam-splitting unit comprising a first, a second and a third beam splitters, the first beam splitter splitting the laser beam into two light beams along a first and a second directions, the second and the third beam splitters being respectively arranged in the first and the second directions to split the two light beams into four light beams along four different directions; and
   a beam-outgoing unit dispersing the four light beams to form four horizontal sector-shaped output beams, the four sector-shaped output beams together forming an output beam having an angle approximately of 360 degrees.

11. The laser level as claimed in claim 10, wherein the laser light source is a semiconductor laser module.

12. The laser level as claimed in claim 11, wherein each beam splitter has a splitting interface having an angle of 45 degrees.

13. The laser level as claimed in claim 12, further comprising a diverging lens disposed between the laser light source and the first beam splitter for adjusting the laser beam emitted from the laser light source to have a predetermined angle and a substantially circular cross section.

14. The laser level as claimed in claim 13, further comprising plural collimating lenses disposed between the beam-outgoing unit and the second and the third beam splitters for collimating each light beam transmitted from a corresponding one of the second and the third beam splitters to form a horizontal band-shaped light beam.

15. The laser level as claimed in claim 14, wherein the beam-outgoing unit comprises a first, a second, a third and a fourth aspheric cylindrical lenses, each aspheric cylindrical lens dispersing the band-shaped light beam to form a horizontal sector-shaped output beam having an angle greater than 90 degrees.

* * * * *